SYNCHRONIZING AND PHASING BROADBAND CROSS-SCAN TAPE RECORDINGS

Filed March 3, 1966

2 Sheets-Sheet 1

Inventor:
Thomas A. Banning, Jr.
Thos. A. Banning Jr

SYNCHRONIZING AND PHASING BROADBAND CROSS-SCAN TAPE RECORDINGS

Filed March 3, 1966 2 Sheets-Sheet 2

Inventor:
Thomas A. Banning Jr.

United States Patent Office 3,476,872

Patented Nov. 4, 1969

3,476,872

SYNCHRONIZING AND PHASING BROADBAND CROSS-SCAN TAPE RECORDINGS

Thomas A. Banning, Jr., Chicago, Ill.

Continuation-in-part of application Ser. No. 491,749, Sept. 30, 1965. This application Mar. 3, 1966, Ser. No. 540,440

Int. Cl. H04n 5/76

U.S. Cl. 178—6.6 23 Claims

ABSTRACT OF THE DISCLOSURE

This case provides means to test and compare the rate of arrival of recorded cross-scans on the tape, with the rate of production of signals for producing horizontal deflections of the kinescope beam of the receiver. Also, for sensing the rate of arrival of recorded synchronizing signals on the tape, with the rate of production of the bursts which produce the resettings of the kinescope beam, and for comparing the instants of arrival of both such synchronizing records, with the instants of production of the resetting bursts. Provision is made for corrections of the rates of arrival of the cross-scans with the rate of production of the horizontal deflections; and for corrections of the nonsimultaneous arrival of the recorded synchronizing signals, and the production of the bursts.

This invention relates to improvements in synchronizing and phasing broadband cross-scan tape recordings, and the like.

This application is a continuation-in-part of my copending application Ser. No. 491,749, filed Sept. 30, 1965, now U.S. Patent No. 3,383,462, as a division of my copending application for patent on Improvements in Subscription or Pay-Television, and the Like, Ser. No. 459,399, filed May 27, 1965, now U.S. Patent No. 3,365,542.

The following statement will outline certain of the operational and other conditions which accompany cross-scan tape recordings, being recordings wherein the recorded signals are produced and must afterwards be sensed as signals carried by the travelling tape in the form of cross-scans extending across the tape close together, instead of comprising a linearly extending recording, wherein the signals are progressively recorded and afterwards scanned in such linear progress. Such cross-scans are disclosed, by way of example, in my issued U.S. Patent No. 2,976,354, filed May 4, 1954, and issued Mar. 21, 1961, and also in numerous other applications for U.S. patents, and issued patents, filed by me. Under the cross-scanning operational recordings, each cross-scan may carry many signal variations, dependent on the width of the cross-scanning area of the tape, and on the operation itself; so that, by producing the cross-scans close together as the tape progresses during recording and scanning, the number of signal variations recorded per unit length of tape travel (e.g., per inch), may be greatly multiplied as compared to the number of signal variations which may be recorded and afterwards sensed, under the lineal scanning operations conventionally used at the present time. In fact, by producing the cross-scans as close together as two mils, and by using a tape of two inches scanning width, it is possible to produce two times 500 or 1000 times as many signal variations per inch of tape travel as may be accommodated on a single linear scan recording along the tape length. For this reason, among others, it is imperative that the cross-scanning technique be used when the rate of signal variations is high, as for example, in the case of television signal recordings, being of the order of several megacycles/sec.

The production of the cross-scanned recordings may be as one cross-scan (or multiple thereof), corresponding to each lateral deflection of the electron beam of the kinescope of a television receiver. Under this operation, each cross-scan so recorded on the tape will include variations of strength at all points along such scan, corresponding to the variations of strength of the electron beam of the kinescope, when the same program is being both televised and recorded at the same time. My earlier patents and applications, including the identified patent, No. 2,976,354, include means to produce and to sense such cross-scan recordings by use of a laterally deflectable electron beam unit wherein each cross-scan of the recorder and sensor is produced under the same lateral deflection producing control. Other cross-scanning arrangements may be used within the purview of the disclosures hereinafter revealed.

My earlier patent, No. 2,976,354, and other patents and applications filed by me also include provision for recording on the tape, the signals, such as bursts identifying termination of each field of lateral deflections of the kinescope and commencement of the succeeding field of such lateral deflections. Accordingly, during scanning and sensing the recordings at a later time, during a replaying operation, the signals sensed from such burst signal recordings may be used for controlling the resetting of the electron beam of the kinescope to its starting position synchronously with the termination of each field of cross-scanned recordings, and commencement of the succeeding field of such cross-scan recordings. Thus the rasters produced on the kinescope viewing screen will comprise correctly placed lateral deflection elements of the picture.

Under the foregoing and related operations, there are produced on the tape cross-scanned records of the lateral deflections of the kinescope beam and its strength, for each field of the televised picture component of the program. Each such field of cross-scan recordings is identified by the distance between two of the burst signal records. Such burst signal records are hereinafter referred to as synchronizing signals. It is also evident that each such recorded field of cross-scan records carries the same number of cross-scan recordings as the number of lateral deflections produced by the kinescope beam. Under present regulations of the FCC there are 262 (or 263) such lateral beam deflections per field, and there are two such fields to comprise each frame of the picture. Thus each frame when recorded as two fields of cross-scans, will include 525 cross-scans, and will require 525/500 inch of tape length for the recording of each frame, being 1.05 inches of tape. When producing 30 frames per second, being the conventional rate, the tape speed need be 31.50 inches/sec., on the assumed basis of two mils spacing between cross-scans. This tape speed may of course be reduced to 15.75 inches/sec. by reducing the spacing to one mil.

The conventional burst received with the televised signals may be used for production of the synchronizing signal records on the tape. Accordingly, the rate of production of such synchronizing signal records is the same as the rate of production of the fields of deflection in the television receiver, both such television deflections and tape recordings being from a common source. During reception of the television video component of the program, the lateral deflections of the sawtooth generator are adjusted to meet the required number of such deflections between the two burst signals defining the field being translated; and since the deflections of the beam of the recorder scan producing unit are then being synchronized with the lateral deflections of the kinescope (both sets of deflections being produced by the same unit), it follows that the number of cross-scans produced on the tape between the two successive synchronizing signals, will be the same as the number of lateral deflections of the kinescope beam. A correct recording is thus produced.

During the playing back operation, the recorded synchronizing signals are used to produce the resetting of the beam of the kinescope to its starting position for a new field. Also, during the playing-back, the lateral deflections for both the receiver kinescope and the sensing unit of the recorder are produced by a common deflection producing unit, generally a sawtooth generator, and, when the playback is to be to the same television receiver as used during the recording operation, such sawtooth generator is conveniently the unit of such receiver. In either case, the rates of deflections of both the kinescope beam and the deflectable beam of the recorder unit are the same.

The rate of arrival of the recorded cross-scans at the position of the sensing unit, during playing-back, depends on the rate of tape travel. But the rate of beam deflections of the deflectable beam of the recording and sensing unit depends on the rate of production of the beam deflection signals by the common beam deflection producing unit already referred to. Likewise, the rate of arrival of the recorded synchronizing signals at the sensing unit for such synchronizing signals, comprising a portion of the recorder, depends on the rate of tape travel. Accordingly, it becomes apparent that the rate of tape travel and the rate at which the common source of deflecting signals produces lateral deflection producing signals, must be brought into harmony to produce synchronized operation, wherein the rate of lateral deflections produced in both the beam producing unit of the recorder and the lateral beam producing unit of the kinescope, hramonize with the rate at which the recorded cross-scans arrive at the location of the cross-scan sensing unit—namely, the tape speed. Any departure from such condition of equality of such rates, will result in improper and unsatisfactory operation during playing-back.

Evidently, such harmony or synchronized condition must be corrected, when not present, by changing one or both of the speeds (tape speed or rate of production of the lateral deflections by the sawtooth generator) to a condition of equality of such rates. Having produced such equality the speeds must be retained in a condition of equality, to continue production of desired perfection of playing-back.

The necessary correction may be made by correcting tape speed, or rate of production of the lateral deflections. Means to effect such corrections as needed by both such basic operations, have been disclosed herein. It is here noted, however, that even when driving the tape by a high quality synchronous motor, slight variations of the rate of such motor occur, due to slight variations in the rate of alternations of the supplied current, as well as other forces; and also, that when the corrections are made by slight adjustments of the rate of deflections of the sawtooth generator, such rate of the deflections may suffer slight variations during normal operation, due to various changed conditions, such as temperature, etc. Thus, the means to produce the needed equality of rates for desired perfection of playing-back, must include proper comparison means to constantly compare the two rates, then determine the amount and direction of any disparity between them, and effect correction, either of the tape speed or the rate of deflections production, with production of the correction in either a positive or a negative direction, as determined by such comparison means. I have included all such means as needed to effect correction to the condition of equality of rates, and to constantly test and compare the rates, with means to effect the needed corrections, either intermittently, if proper, or continuously, if needed.

Still more precisely the corrections must include a further operation, which will be conveniently termed a "phasing" operation. The need for this correction factor will be apparent from the following statement:

When the two rates already referred to have been synchronized and are equal, it may nevertheless happen that the scan records carried by the tape and constituting a recorded field of cross-scans are not scanned in phase with the lateral deflections of the kinescope beam for production of a field of lateral deflections produced by the kinescope beam. This condition might arise when the sawtooth generator and associated units control the resetting of the kinescope beam, to its starting position, independently of control by the sensing of the synchronizing records carried by the tape, and recorded thereon at the time of producing the tape recording so that in such case the resetting of the kinescope beam was not controlled by the sensing of the previously recorded synchronizing signals.

As an example of such nonphased operation the following is shown:

If the recorded cross-scan #1 of a field on the tape arrives at the cross-scan sensor at the same instant as the production of lateral deflection #21 of the kinescope, all successive recorded cross-scans of the tape will arrive at the cross-scan sensor, 20 scan lines later than the like numbered horizontal deflections of the kinescope beam. Accordingly, the horizontal deflections for succeeding lines of the raster produced on the viewing screen, will all be produced under strength control of recorded cross-scans of numbers 20 digits lower than the numbers of such succeeding raster produced lines. This spatial displacement will continue until recorded cross-scan #242 on the tape arrives at the cross-scan sensor simultaneously with arrival of the last line (#262) on the raster. This will leave the last 20 lines or cross-scan recordings of the field on the tape, to control the first 20 lines produced on the viewing screen, for the next viewing screen raster. Accordingly, the picture produced by such an operation will have its lower 20 lines transferred from its bottom portion and superimposed to the top of such picture.

It is now noted that when the horizontal deflection producing units of the television (such as the sawtooth generator) receives its signal for resetting the beam to its starting position, from the synchronizing signal records carried by the tape, by sensing such records during tape travel, the phasing operation is produced; since each field of horizontal deflections of the kinescope beam is caused to reset to the starting position, synchronously with termination of a field of recorded cross-scans on the tape, and commencement of the next field of such horizontal deflections of the kinescope beam. When the tape recorder is used for reading a recorded television program and delivering its signals from sensing of the recorded cross-scans, it may be desirable to provide such recorder with its own sawtooth generator or like unit, constituted to deliver the lateral deflection signals needed for control of the kinescope beam, and also the signal denoting completion of a field of deflections and commencement of the next field. Such sawtooth generator or like unit will then be available for production of needed operations in the recorder, both during recording, and afterwards during playing-back. In case of such embodiment wherein the recorder is itself provided with a sawtooth generator, provision must be made for producing the phasing operations already outlined herein, since provision is then needed to ensure against nonphasing of the operations of such recorder sawtooth generator, with the operations of the sawtooth generator of the television receiver itself. I have herein disclosed such phasing means, as well as the synchronizing means previously referred to herein.

The hereinafter disclosed structures include means to determine the rate of tape travel on the basis of rate of arrival of the cross-scan recordings at the sensing unit; also to determine the rate of lateral deflections of the beam of the deflectable beam unit of the recorder; means to compare such two rates and to determine and give an indication of any disparity between such rates, including the direction of such disparity, that is, to determine which rate is the higher; and to cause correction of either the rate of tape travel or the rate of production of the lateral deflections by increase or decrease of the selection one of the two rates to the condition of zero disparity. Thereafter the synchronized condition thus produced is maintained by producing such slight rate adjustments from time to time as may be needed to maintain the desired equality of the two rates. The means to effect such rate corrections either by slight corrections of the rate of tape travel, or slight corrections of the rate of the lateral deflections, are shown schematically hereinafter.

I have also disclosed means to compare the instants of production of the recorded synchronizing signals as carried by the tape, with the instants of emission of the bursts or like signals which denote termination of the fields of lateral scans delivered by the lateral deflection producing means or other means which may deliver such field of scans termination instant; and I have provided means to cause a slight change of the speed of the tape or the speed of the lateral deflections, for a short interval, to allow the signals carried by the tape and which define termination of recorded cross-scans of a field, or the signals which denote termination of the field of beam deflections, when such two field termination denoting signals are not produced simultaneously; and for preventing such phasing correction from occurring when such two field termination denoting signals arrive simultaneously, indicating the attainment of the desired phase condition.

Such slight change of tape rate for production of the phased condition would of itself disturb the condition of speed or rate synchronization previously attained, thus causing a counter operation tending to prevent attainment of the desired phased condition. I have made provision for temporarily preventing the synchronism producing means correction during the interval of phase correction, to thus enable attainment of the phased condition, and for restoring the operativeness of the synchronizing means immediately after the phased condition has been attained. This will eliminate any slight disturbance of the equality of rates which may have occurred during the phasing operation.

Since the phasing operation is produced by change of tape speed for an interval sufficient to bring the two rates into phased condition, it is also desirable to prevent such phasing operation (by change of tape speed) to occur at any time when the normal tape drive is not in operation—that is, any time prior to starting the tape driving motor. I have made provision for preventing functioning of the phasing means except when the tape drive motor is energized.

Other objects and uses of the invention will appear from a detailed description of the same, which consists of the features of invention and combinations of parts, hereinafter described and claimed.

In the drawings:

FIGURE 1 shows schematically portions of two tape recordings carrying cross-scanned signals, wherein one set of video signals is recorded on each tape recording, and another set of audio signals is recorded superimposed on each of such tape recordings; with a sensing unit for video signals, and a sensing unit for audio signals, in place with respect to each such tape recording, for sensing the corresponding cross-scan records (either video or audio); and with provision for transmitting the so sensed video and audio signals, which may, by way of example, correspond to two different aesthetic renditions of a given program, in such manner as to enable recepion of such two renditions according to the operational conditions set forth in my said Patent No. 3,383,-462 and Patent No. 3,365,542; the disclosures of such parent application including drive of both such tape recordings at substantially the same speed, the showing of the two tapes in FIGURE 1 in tandem instead of side by side being a matter of convenience of placement on the drawing sheet; and this figure also shows schematically, the switching means provided in connection with such two tape recordings, for production of the operational conditions fully discolsed in such parent application;

FIGURE 2 shows schematically, a section of a time comparison of the renditions of the recordings of the two tape elements of FIGURE 1, according to the disclosures of my said parent application;

FIGURE 3 shows schematically, a section of tape carrying cross-scan recordings (not shown as they are invisible), and a sensing unit in place with respect to such tape, to sense and deliver signals according to the sensing of the cross-scan records being a sensing unit which may for example, correspond to the disclosures of my earlier patent, No. 2,976,354; such figure also showing synchronizing signal records proximate to the recorded cross-scans, and a synchronizing signal record sensing element in place with respect to the tape; also, by way of example, correspoding to the disclosures of such earlier patent; and this figure shows schematically, means to compare the rates of arrival of cross-scan recordings at the location of the cross-scan sensing unit, with the rates of horizontal deflections produced, for example, in a television received kinescope, and for producing corrections to reduce any disparity between such compared rates, to bring them to equality; and this figure also shows phasing means constituted to produce phasing corrections to cause the successive cross-scans being sensed to arrive at the sensing location simultaneously with production of the horizontal deflections of the kinescope beam, to which such sensed cross-scans correspond;

FIGURE 4 shows one embodiment of a rate comparator for comparing the rates of the horizontal deflections and of the arrival of the recorded cross-scans at the sensing location, for determining the direction and rate (amount) of disparity between such two rates, and for translating such disparity into rotations which may be delivered to rate controlling elements of the tape driving equipment; the comparator illustrated comprising two identical stepping motors acting together to compare the rates of pulses delivered to the motor stators, thus delivering output shaft rotations in direction corresponding to the realtive rate values, both as to direction of such rotation, and to the rate of rotation, being the difference between the two rates of delivered pulses;

FIGURES 5, 6 and 7 are cross-sections through the showing of FIGURE 4, being taken on the lines 5–5, 6–6 and 7–7 of FIGURE 4, looking in the directions of the arrows; and these three figures show the realtive tooth positions of the rotor section of one of the motors, at completion of a pulse delivered to the stator A, to bring the rotor and stator teeth of such rotor and stator into registry, with simultaneous shift of the rotor teeth of the other two motor sections B and C, to positions relative to the corresponding stator teeth, as shown in the figures;

FIGURE 8 shows schematically a simple form of element constituted to receive a pulse and translate the effects thereof into three successive and equally time-spaced pulses; such unit being used for delivery of three such secondary pulses to the three stator coils of the motor being pulses, corresopnding to each received pulse;

FIGURE 9 shows an irregular section taken on the line 9–9 of FIGURE 3, looking in the direction of the arrows; and FIGURE 9 shows schematically, a form of differential transmission unit for transferring driving input shaft rotations to the output shaft which drives the tape drive element, either at the same rate as such input shaft, or at either increased or decreased rate and number of such increased rate rotations, to effect corrections of the rate of tape drive, from time to time;

Figures 1, 2, 3, 11, 14:
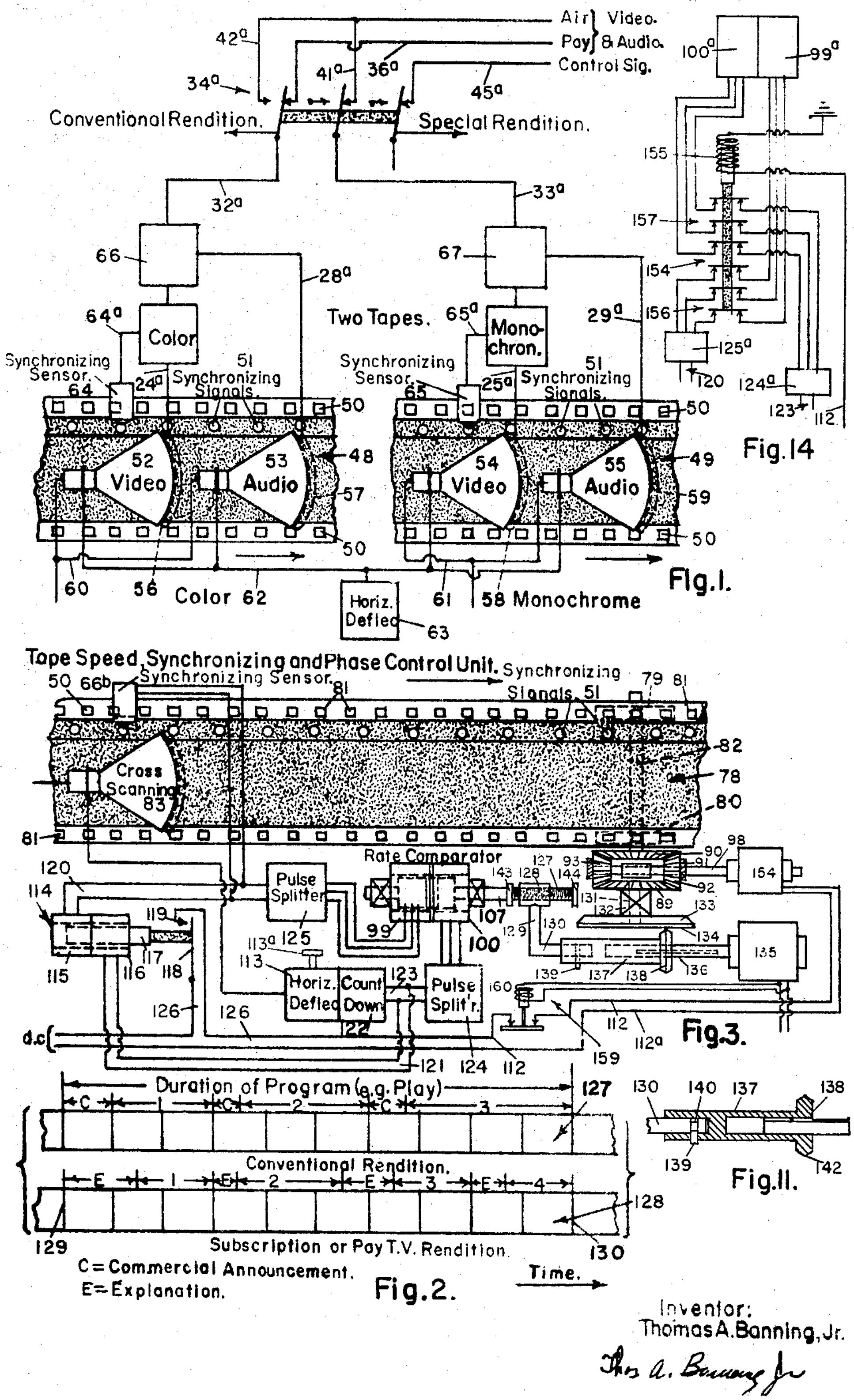
FIGURE 11 shows a detail section through the splined drive of the friction wheel by the tape driving motor, and the connection to such friction wheel from the comparator shaft, to effect correction of the radius of drive from the friction wheel to the driven disk, of the variable ratio drive from the driving motor to the tape engaging element, on enlarged scale as compared to FIGURE 3.
Figures 4, 5, 6, 7, 8, 9, 10, 12, 13, 15:
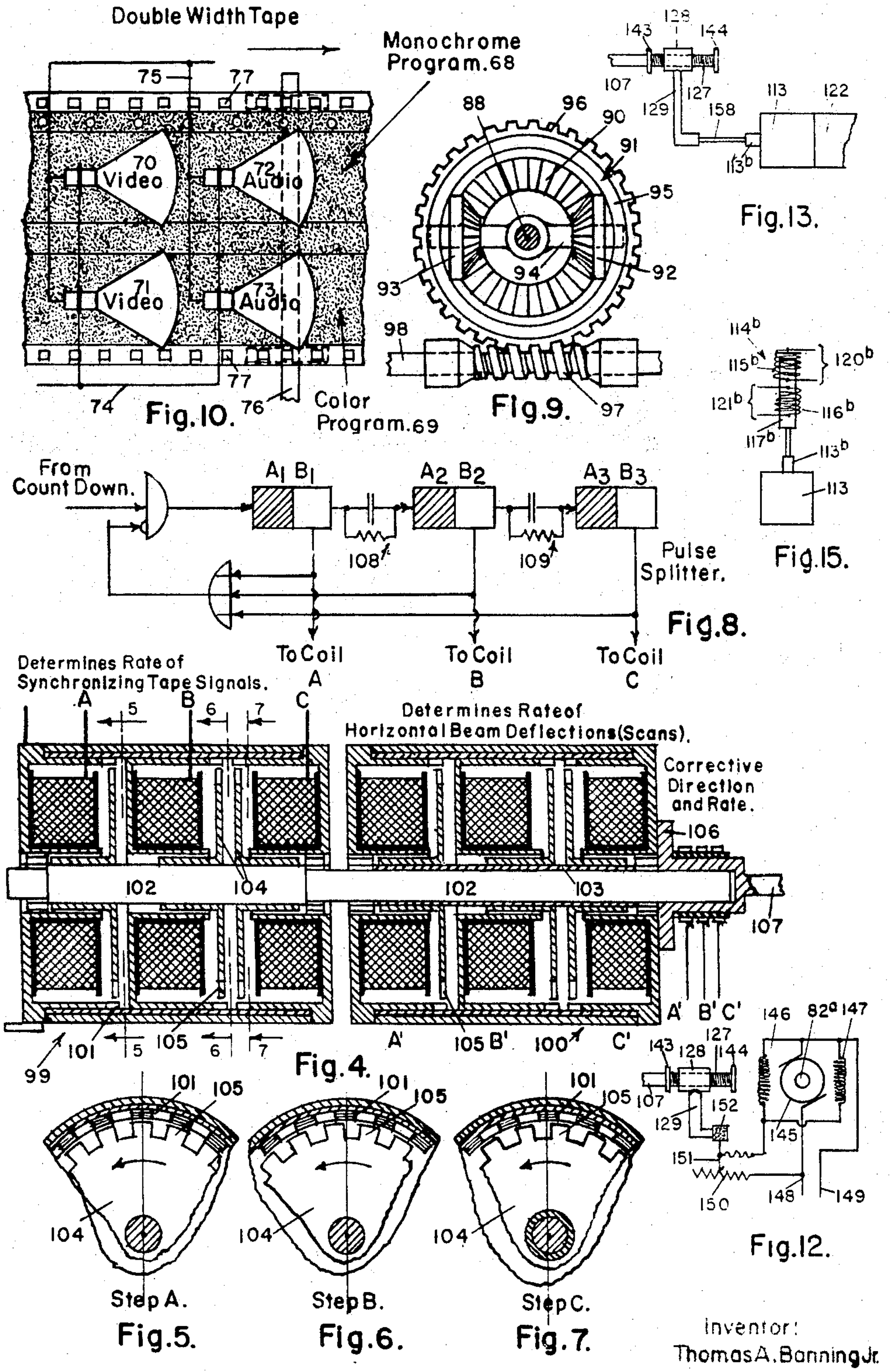
FIGURE 10 shows a section of tape width sufficient to accommodate two sets of cross-scan recordings side-by-side; and this figure also shows a video deflectable beam, recording and sensing unit for each tape width, and an audio deflectable beam, recording and sensing unit for each tape width, together with the synchronizing signal recordings along the tape length.
FIGURE 12 shows a fragmentary portion of the showing of FIGURE 3, wherein the comparator shaft acts to vary the field strength of a shunt motor which drives the tape engaging elemet, thus effecting correction of tape speed by change of the speed of the tape driving motor.
FIGURE 13 shows another fragmentary portion of the showing of FIGURE 3, wherein the comparator shaft acts to vary the frequency of the lateral deflection unit signals by which the deflections of the beams are varied to effect desired equality with the rate of arrival of the recorded cross-scans at the sensing location.

FIGURE 14 shows a switching arrangement by which the delivery of the pulses to both of the stepping motor elements is interrupted during the phasing operation, but is restored upon completion of the phasing operation, to cause the comparator to resume its function of comparing the two rates, with production of successive corrections, needed to maintain the two rates in equality, the phasing having been effected; and FIGURE 15 shows a detail of a modified form of phasing production, by temporarily changing the rate of production of the deflection producing signals, and the corresponding synchronizing signals.

In FIGURE 1 I have shown one embodiment of a tape recorder and playback installation with which the features of my present invention may be used. The tape recorder shown in this figure is also shown in my parent application Patent No. 3,383,462, and the precedent application Patent No. 3,365,542. It includes provisions for sensing and translating a prerecorded program of which the recordings have been made for translation into signals for the video components of the program under both monochrome and color signals translations, simultaneously. In the particular embodiment shown in FIGURE 1 of this case, the tape sections 48 and 49 are shown in alignment with each other, but as explained in that parent case, such two companion tape sections may also be located alongside each other; or they may comprise a double width tape whereon such two sets of recordings are jointly carried. All such alternative embodiments are contemplated as being within the disclosures to be herein described, insofar as concerns the tape controls, for both the synchronizing and the phasing operations.

In the showing of FIGURE 1 there are included schematic showings of connections from the tape recordings to outlet terminals by which the operations for subscription or pay-television may be produced and controlled. Such schematic showings include master switching means which is used for controlling the deliveries of the video and audio signals for such subscription or pay operations. This figure also includes the showing of sensors for both video and audio signals which have been cross-scan recorded on the tape surfaces; all such showings being showings of specific uses of the tape control operations, especially during sensing for playback, hereinafter to be disclosed in detail.

Interconnections between the horizontal and vertical deflection producing means, and the synchronizing signal means of a television receiver and the means to produce the synchronizing signal records, on the tape; and also interconnections between the means for sensing the synchronizing signal records previously recorded on the tape, with the horizontal and vertical deflection producing means of the television receiver, are disclosed and shown in FIGURES 79, 80, 83 and 84 of Letters Pattent of the United States, No. 2,976,354, issued Mar. 21, 1961, on the application of myself and Emil L. Ranseen, Ser. No. 427,428, filed May 4, 1954, now U.S. Patent No. 3,365,-370, and issued entire interest to me; and in FIGURES 18, 19, 22 and 23 of application Ser. No. 94,651, filed Mar. 9, 1961, by me and Agnes J. Ranseen, as executrix of the estate of Emil L. Ranseen, deceased, and issued Jan. 5, 1965, as Letters Patent No. 3,164,685, entire interest to me; and in FIGURES 1–A, 1–B, 19 and 20, of application Ser. No. 419,612, now U.S. Patent No. 3,351,-718, filed Dec. 18, 1964, by me and Agnes J. Ranseen, as executrix of the estate of Emil L. Ranseen, deceased, and assigned, entire interest to me.

In FIGURE 1 of this case I have shown the two wide band tapes 48 for the color recording and 49 for the monochrome recording of the program. These tapes carry cross-scans for the video components of the two program renditions, such cross-scans not being shown in the figure to avoid confusion of the showings. In the particular embodiment illustrated I have also made provision for producing the audio components of the renditions by cross-scans, also not shown. Such arrangements are also fully disclosed in the earlier patents hereinbefore identified, as well as other pending applications by me. The tapes shown in FIGURE 1 may also be provided with the edge perforations 50 by which the tapes are driven. This will be hereinafter referred to. Also the regularly spaced synchronizing signal recordings 51 are shown on such tapes 48 and 49, and such recordings are also extensively shown in my identified earlier cases. I have also, in FIGURES 1 and 3, shown the recorder reflectable beam units of generally triangular form, 52 and 53, left-hand element, and 54 and 55, right-hand element. There the elements 52 and 54 are designated as "Video," and the elements 53 and 55 as "Audio." These units are deflectable electron beam scanning units constituted to deliver scanning force effects to the outside of the units, for sensing previously produced cross-scan recordings carried by the respective tapes, and to produce signals of varying strength according to the variations of the strengths of the cross-scans so sensed. It is also noted that in my earlier and identified cases I have disclosed scannings and recordings of audio frequency signals, superimposed on video signal cross-scan radio frequently signals, selective sensing scanning of both sets of such signals being possible due to the great disparity between the frequencies of the video and audio signal variations. Accordingly, I have shown both sets of deflectable beam elements in operative positions with respect to the tapes being sensed. I have also shown the sensing plates or elements 56, 57, 58 and 59 close to the right-hand edges of the elements 52, 53, 54 and 55, respectively, which sensing plates deliver variations of potential corresponding to the variations of the strengths of the magnetized (or static electrified) areas above or adjacent to such plates; and I have also shown the lines 24$^a$ and 25$^a$ connecting such sensing plates 56 and 58 for the video sensings, to the corresponding "Color" and "Monochrome" units, for delivering the sensed video signals to such units; and I have also shown the lines 28$^a$ and 29$^a$ connecting the sensing plates 57 and 59 to the units 66 and 67, respectively, for inclusion of the audio signals into the emitted signals, either by radio transmission or by nonaccessible wire transmission, such as coaxial cables.

During the sensing operations the strengths of the beams of the deflectable beam units are held constant so that the effects produced on the sensing plates by such constant strength beams, are modulated or modified by the strengths of the magnetic recordings from incremental area to incremental area of the tape during sensing and tape travel. Thus the effects of the varying magnetic recordings are transmitted to the sensing plates 56, 57, 58 and 59, and such effects are communicated to other units for processing. To hold the beams constant during these operations I have shown the line 60 connected to the guns of the units 52 and 53, and the line 61 connected to the guns of the units 54 and 55. These lines 60 and 61 may be connected to other elements of the recorder or to proper controls which need not be described in detail here since they are disclosed in one or more of my issued patents or pending applications.

In FIGURE 1 I have also shown the line 62 connected to the deflection yokes of the units 52, 53, 54 and 55. Such line 62 connects to the unit 63, comprising a horizontal deflection signal producing unit, such as a sawtooth generator. This unit accordingly delivers its deflection signals at the specified rate (15,750 per/sec., under FCC rules). In FIGURE 1 I have also shown the synchronizing signal units 64 and 65 in position to act or the tape during recording operations, or to sense previously recorded synchronizing signals during playback. In the showing of FIGURE 1 these units are shown as connected by the lines $64^a$ and $65^a$ to the units legended "Color" and "Monochrome," respectively. Such units "Color" and "Monochrome" are connected to the transmission units 66 and 67, respectively, for emission of the full information needed to enable reception of both the video and the audio program components, as well as the synchronizing signals for such programs. Such emissions are possible under control of the main switching unit to which the units 66 and 67 are connected by the lines $32^a$ and $33^a$. Such switching unit is constituted for production of various emission operations, all as fully disclosed in my copending Patent No. 3,365,542, already referred to herein.

Although in the showing of FIGURE 1 the two tapes 48 and 49 are shown for the two sets of recordings for the two basic renditions of the programs, both such tapes should be provided with the synchronizing and phasing controls hereinafter described in detail; or both such tapes may be controlled by a single synchronizing control and phasing control. In the showing of FIGURE 10, wherein the tape is of width sufficient to accommodate the two recording areas (for "Color" and "Monochrome," respectively), a single synchronizing control and a single phasing control are sufficient. In this FIGURE 10 the band areas for the two program renditions are legended "Monochrome Programs," 68, and "Color Program," 69, respectively. The units 70 and 71, legended "Video," and the units 72 and 73, legended "Audio," are provided for the two band areas, the units 70 and 72 serving the "Monochrome" area, and the units 71 and 73 serving the "Color" areas. In the present case the single horizontal deflection line 74 serves all four of such units 70, 71, 72 and 73, thus retaining the horizontal deflections of all four such units in continuous and exact synchronism and phase. Also, the single potential line 75 serves the electron beams of all of such units to maintain such beams all in steady condition, during sensing and playback operations.

The single tape drive shaft 76 serves this double width tape embodiment. Consequently, a single tape speed control is sufficient to effect the desired synchronizing and phasing operations.

FIGURE 3 shows schematically a simple embodiment of the tape drive control elements to produce synchronization and phasing according to the hereinbefore stated operations. The tape carrying the recorded cross-scans is identified as 78. It may be driven by the two sprockets 79 and 80, engaging the sprocket holes 81 along the tape edges. Both sprockets are carried and driven by the common drive shaft 82. I have shown only one of the deflectable beam units 83 in place above the top surface of the tape. The synchronizing records are shown along one edge portion of the tape, and the corresponding sensor plate 85 is located in position to sense and deliver a signal as each of the records arrives at the location of such sensor.

The motor 86 is provided for driving the shaft 82; such motor is what is conventionally termed a constant speed motor (e.g., a synchronous A.C. motor, or a shunt wound D.C. motor). It is, however, noted that such term "constant speed" is subject to a slightly broad interpretation, since even a synchronous A.C. motor must hold its speed to slight variations of the supplied A.C., and a shunt D.C. motor will show slight changes of its speed due to changes in resistance of its shunt wound field with changes of temperature, unless the field be a compound wound field. Accordingly, to synchronize the rate of arrival of the scan recordings at the sensing unit, with the rate of the horizontal deflections of the beam of the sensor, corrections must be made, even of slight amount, in one or the other of the compared rates. Since the recorded cross-scans are very close together on the tape, and since they are arriving at the location of the sensor at a high rate (e.g., 15,750/sec.), is it seen that even slight variations in one or the other of the compared rates will throw the operation out of synchronism, and create a momentary disparity requiring prompt corrective action. I have provided means to effect very prompt correction of the rate whose value is being controlled, with such correction occurring in that direction (either increase or decrease) needed, and with termination of the corrective effect immediately that synchronism is attained. As long as such synchronism continues, no further corrective action occurs; but further correction will be immediately instituted in the proper direction as soon as a further disparity of the rates occurs. Such rate testing and comparing and disparity indicating unit is shown in FIGURE 3 where it is legended "Rate Comparator." It includes the two stepping motors 99 and 100, preferably located close together, or even as a single unit, with their shafts co-axial, as shown in FIGURES 3 and 4. Each of these motors includes a stator element including three fields with their coils A, B and C in the motor 99 and A′, B′, and C′ in the motor 100. These several coils are caged in magnetic cages which include teeth around their perimeters so that when the coil of one such cage is electrified, its teeth will all become magnetized at the same polarity and density. Such cages and their teeth are carried by the housings of the motors, respectively. The teeth of a typical such cage are identified as 101 in FIGURES 5, 6 and 7. For convenience of identification and nomenclature I shall refer to the motor 99 as the reference motor, and the motor 100 as the correction motor. The shaft 102 of the reference motor is journalled for rotation. This shaft extends through the correction motor and terminates at the right-hand end thereof (see FIGURE 4). For convenience of assembly such shaft is reduced in diameter where it passes through the correction motor; but during assembly the sleeve 103 is set onto such reduced diameter portion and secured in place so that such sleeve constitutes in effect a portion of the shaft. Each of the motors 99 and 100 is provided with three disk-like armature or rotor elements 104 secured to the shaft 102 (or to the sleeve 103), in position to register radially with the teeth of the corresponding stator cage. Each of these disk-like structures is provided in its periphery with teeth 105 equal in number to the teeth of the cage to which it corresponds (all of the stator fields and all of the rotors having the same number of teeth). The disk-like armatures are so secured to the shaft (or to the sleeve 103) in rotated or angular position, that when the rotor teeth of the disk of the rotor section A (or A′) register completely with the corresponding cage teeth, the rotor teeth of the other rotor portions B and C (or B′ and C′) are angularly displaced by one-third of a tooth distance center to center (in the case of the motor section B (or B′), or two-thirds of a tooth distance center to center (in the case of the motor section C (or C′). Accordingly, if the first pulse is delivered to the motor stator coil A (or A′), the rotor unit as a whole will be advanced to position of registry of the A teeth with corresponding stator teeth, as shown in FIGURE 5; and the rotor teeth of the sections B and C (or B′ and C′) will be brought into the positions shown in FIGURES 6 and 7. Then, when the next pulse arrives and is delivered to the coil B (or B'), the rotor as a whole will be advanced an angular amount equal to one-third of the angular distance between teeth (center to center); and when the third pulse arrives and is delivered to the coil C (or C'), the rotor as a whole will be advanced another third of such tooth-to-tooth angular distance, to restore the teeth of the section A (or A') to the position shown in FIGURE 5. Thus, by delivering successive pulses to the three coils of either of the motor units, with proper succession of such pulses to the three coils of the corresponding motor unit, rotation between the rotor and the stator of such motor unit will be produced.

It is further evident that such pulses thus delivered to the three coils of a motor unit may be delivered according to either the sequence A–B–C or the sequence A–C–B. The direction of rotation produced will thus depend on which sequence of pulse delivery is used. It will presently appear that when using the structures now being described, there is no need to reverse the sequence of the pulses delivered to either motor element, since the rotational effects produced in both of the stators shall be the same to effect corrections in either an increasing or a decreasing rate of tape travel (when the rate of that component is under control). This is true once the proper sequence has been determined for a given installation, including the elements of structure to which the corrective rotations are delivered. It will also appear that the rate of rotation of the fields produced in the two motor sections will depend on the rate at which the pulses are delivered to such sections, individually.

It will also be evident that by use of structures including numerous teeth in each stator element (and its rotor), the rate of delivered shaft rotation may be lowered. Thus, if the number of teeth in each motor section is thirty, and if the rate of pulse delivery is 180/sec., the rate of rotation will be two revolutions/sec., since the angular advance per pulse is one-third of a tooth, requiring ninety pulses to produce one rotation. Further, if provision is made for delivery of one pulse to a motor section, corresponding to each recorded signal (on the tape recording), and if each recorded signal corresponds to one field of scanning (under FCC specifications), then there will be delivered 60 such synchronizing signals/sec. And if each such synchronizing signal pulse be divided into three subpulses (as will be presently disclosed), there will be delivered 180 of such subpulses/sec., corresponding to two r.p.m. of the field produced in the stator of such motor section, either 99 or 100 (see FIGURE 3).

Next; the horizontal deflection control unit, such as a sawtooth generator, whether comprising a portion of the television receiver, or a special unit comprising a portion of the recorder, will or may be made to deliver 60 or some other desired number of pulses/sec., to produce the fields of deflection of the beam of the receiver. Connections are established between the sawtooth generator (or other burst producing unit), and the lateral or horizontal deflection producing yoke of the deflectable beam unit of the recorder, to cause such beam to execute its cross-scans in synchronism with the horizontal deflections of the kinescope beam.

During the recording operation at which the tape recording was produced, the scan records were established on the tape at positions corresponding to the successive horizontal deflections of the kinescope beam. Also, during such recording operations the busts defining completion of successive fields of kinescope scans, were communicated to the synchronizing signal record producing unit of the recorder, so there were produced on the tape such synchronizing records at the locations defining completion of successive fields of cross-scans, corresponding to the fields of horizontal deflections produced in the kinescope. These operations are shown, for example, in my patent, No. 2,976,354, already referred to, and also in my patents, Nos. 3,164,665 and 3,351,718, and in other cases filed by me. Accordingly, there have been produced on the tape, between successive synchronizing signal records, groups of recorded cross-scans corresponding in each instance in number to the number of horizontal deflections produced by the kinescope beam between start and conclusions of successive fields of deflections. Afterwards, during playback the rates at which the recorded cross-scans arrive at the sensing location must equal the rates at which horizontal deflections are produced in the kinescope beam. Comparison of these two rates may thus be made by making provision for comparison of the rates of arrival of the synchronizing signal recordings at the corresponding synchronizing signal sensing position, with the rates at which the bursts of signals denoting resetting of the kinescope beam at its starting position occur. Since the number of cross-scan records produced on the tape equalled the number of horizontal deflections of the kinescope beam during the recording operation, it follows that by equating the rate of arrival of the synchronizing signal tape recordings with the rate of delivery of the signals corresponding to resetting of the kinescope beam to its starting position, the rates of sensing of the recorded cross-scans on the tape will correspond to the production of horizontal deflections by the kinescope beam. Synchronization between the two rates will thus be attained. The foregoing comparisons by use of the double stepping motor unit are made possible by the following structures:

Referring again to FIGURE 3, the motor section 99 has its stator coils connected to the synchronizing signal sensing unit by the lines connecting the pulse splitter unit 125 to the synchronizing signal unit 66[b] and connected elements. This unit 125 performs the function already referred to of splitting the received pulses into subpulses, three in number for each received primary pulse. Such unit is then connected to the three stator coils of the motor element 99. Accordingly, the stator of such motor unit 99 will generate a field rotating in direction according to the sequency of delivery of such subpulses. In FIGURE 3 I have also shown the "Horizontal Deflector" unit 113, which relivers the horizontal deflection signals at rate of the desired horizontal deflections of the kinescope beam. Conveniently such unit may be sawtooth generator of the receiver; in other cases such unit may be special to the receiver itself, but constituted to deliver its horizontal deflection producing signals at rate proper for delivery to the horizontal deflection yoke of the kinescope gun. Such unit 113 is also provided with means to effect slight corrections of the rate of its deflection signals such corrections being effected by the element 113[a]. This will be further referred to hereinafter. Since the rate of pulses delivered by the unit is that rate of conventional horizontal deflection production (conventionally, 15,750/sec.), means must be provided to cause such unit 113 to emit signals or pulses at rate greatly reduced from such 15,750/sec. value; in fact, such unit delivers its output signals or pulses at the rate at which the fields of scans are produced, namely, 60 pulses/sec. being the rate needed to reset the kinescope beam to its starting position when such unit 113 is used for such control of the kinescope's operations. Otherwise the rate of delivery of the horizontal deflection signals (15,750) may be reduced by the "Count Down" unit 122, delivering its pulses of 60 sec. rate, to the motor element 100 stator coils. The connections 123 from the unit 122 to such motor unit 100 include the pulse splitter unit 124 to split each received primary pulse into three subpulses, which are delivered to the stator coils of such motor unit 100, for production of the rotary field therein.

The various connections which finally deliver the subpulses to the stator coils of the two motor elements 99 and 100 must be such that the rotating fields produced in both of the stators of such elements 99 and 100, rotate in the same direction. This will be considered presently.

It is now noted that when the rates of the two sets of subpulses delivered to the two motor elements 99 and 100, the output shaft of such Comparator unit will be stationary. This condition is produced by the structural elements of such comparator unit, as follows:

Referring to FIGURES 4, 5, 6, and 7, the stator of the motor section 99 is retained stationary. Accordingly, when the rotating field is generated in this stator by delivery of the successive pulses to its three coils in a selected sequence, the rotor element of such motor section, such rotor element comprising its three disks 105 (only one being numbered in FIGURE 4), is advanced by fast steps, the angular distance equal to the center to center distance between successive teeth of a disk. The shaft 102 is advanced with such rotor of the motor element 99 at speed corresponding to the rate of the pulses. The rotor disks 105 of the motor element 100 are secured to the shaft 102–103, and are therefore compelled to rotate at the speed dictated by the rate of the pulses delivered to the coils of the motor section 99. During such operation, subpulses are being delivered to the coils of the stator of motor element 100, in sequence to produce in that stator a rotating field, rotating in the same direction as the field of the motor element 99. When such rotating field of such motor element 100 rotates at the same speed as the physical rotation speed of the shaft and both rotor elements, it is evident that the stator of the motor element 100 will develop no reaction against the rotor elements of such motor element 100, and such stator element will not be subjected to any torque producing reaction.

Such stator element of the motor element 100 is journalled (to the shaft-sleeve 102–103) at the left-hand end of such stator element, and to the right-hand end portion of the shaft 102, by the cap element 106. The stator coils of such stator element are connected to the slip rings shown at the right-hand portion of such cap element, brushes connecting such slip rings to the lines A′, B′ and C′, for delivery of the subpulses to the coils of such stator element.

With the foregoing structures, it will be seen that whenever the rate of pulses delivered to the stator coils of the motor element 99 exceeds the rate of delivery of the pulses to the stator coils of the motor element 100, the stator of such motor element 100 will be compelled to rotate in the direction of rotor rotation, at a speed equal to the difference between the rates of the two sets of pulses. Conversely, when the rate of the pulses delivered to the stator of such motor element 99 is lower than the rate of delivery of the pulses to the stator of the motor element 100, the stator element of such motor element 100 must rotate backwardly with respect to the rotors, being a physical backward rotation, at a speed equal to the difference between the two rates.

The output shaft 107 is connected to the cap element 106, being thus driven in one direction or the other, or remaining stationary according to the relative speeds or rates of the two sets of pulses.

The output shaft 107 has its projecting portion 127 threaded with a rather fine thread, and the block 128 is threaded on such portion. This block carries the arm 129 to which is connected the lateral extension 130. Such arm and lateral extension are retained against turning with the shaft portion 127, as will soon be apparent. The tape drive motor 135 has its output shaft 136 aligned with such laterally extending portion 130. A sleeve 137 is set onto the motor output shaft, to which such sleeve is splined to effect drive of the sleeve by the motor shaft rotations. Conveniently the motor 135 is provided with a built-in gear reducer so that the rate of drive of its output shaft and the sleeve is correspondingly slow. The rightwardly extending portion of the lateral extension 130 has its rightward end portion which extends into the sleeve 137, provided with the encircling groove 140, into which extends the pin 139 extended through the sleeve, so that backward and forward movements of the block 128 produce corresponding backward and forward movements of the sleeve, while allowing the sleeve to rotate under drive of the motor 135.

A short shaft 131 is journalled in the block 132. The front end of such shaft carries the disk 133 having its front face finished to provide a slightly friction drive surface 134. Such front surface 134 is parallel to the sleeve 137. Such sleeve carries the drive disk 138 having the slightly sharpened edge 142 which frictionally engages the face 134 of the disk 133 to drive such disk during motor output shaft rotation. Assuming that the motor output shaft is retained at substantially constant speed, the rate of rotation of the disk 133 will depend on the radius at which the disk 138 engages such disk 133, measured from the axis of the shaft 131, according to the ratio $R_1/R_2$, where $R_1$ equals the radius of the disk 138 and $R_2$ equals the radius at which the disk 138 engages such driven disk 133. Assuming that the motor speed remains constant it is evident that shifting the disk leftwardly from its position shown in FIGURE 3 will increase the speed of the shaft 131, whereas shift of such disk 138 rightwardly will reduce the speed of such shaft 131. The shaft 131 drives the sprocket shaft 82 and therefore the rate of tape drive will be corrected for either increase or decrease according to the shiftings of the disk 138. Since the disk 138 is shifted back and forth according to rotations of the shaft 127–107, it is seen that differentials of the two compared rates will be reduced by the described equipment, such reductions being terminated when equality of the two rates is attained.

The amount of such corrective operation which may be required will generally be small, so that a comparatively small back and forth movement of the block 128 on the shaft extension 127 will meet all expected requirements. However, to prevent overrun of the block 128 in either direction for more than such small amount of corrective action, I have provided the flanges 143 and 144 on the shaft extension 127, sufficiently separated to take care of all expected corrective operations, with a factor of safety. In case of an excessive corrective requirement in either direction, with resultant jam of the block 128 against either flange, the rotation of the comparator shaft will be locked, with corresponding stalling of the rotor shaft 102–103. Since the torque required for producing the corrections will be small, damage will not result from such stalling. Such a condition might arise, for example, in the case of breakage of the tape.

The foregoing structure will constantly function to promptly correct small disparities of the two compared rates, as such disparities occur. Accordingly, the tape speed will be retained equal to the rate needed for equality between the two rates—the rate of arrival of the recorded cross-scans at the location of the cross-scan sensing unit and the rate of production of the lateral deflections of the beam of the deflectable beam unit. I have also shown that provision should be made for producing the phasing of the operations for reasons already set forth herein. The following structure has been provided to produce such phasing:

A differential unit shown in FIGURE 3 and in detail in FIGURE 9, is included in the drive connection from the shaft 131 to the sprocket shaft 82. This differential unit includes the input and output gear elements 89 and 90, respectively, together with a conventional cage between such gear elements, having the pinions 92 and 93 meshing with the gear elements. Such cage is journalled for rotation coaxially with the gear elements, under worm and gear connection to the shaft 98 (see FIGURES 3 and 9). The small D.C. motor 154 is drivingly connected to such shaft for drive of the cage intermittently by supply of current over the lines 112 and $112^a$. The worm and gear drive is irreversible, so that when rotation of the shaft 98 is not being produced, drive of the differential gear 89 by the shaft 131 acts directly through the cage pinions to drive the output gear 90 at the same speed as the gear 89, but in reverse direction. Preferably the worm and worm gear drive of the cage is of rather fine pitch, so that small corrections presently described may be certainly produced. It is evident that any rotation of the cage will produce an advance (or retreat) of the output gear 90 compared to the input gear 89, thus producing a change of phase between said gears. Such change of phase also effects change of phase of the tape drive sprocket, with respect to the disk 133 which is driven by the tape drive motor 135 through the ratio controlling disk 138. Accordingly, the drive of the phasing motor 154 will effect phase change proportionate to the angular movement of the sprocket shaft 82 as compared to the disk 133.

Such phasing operation may be in either direction of phase correction, depending on the rotational direction of the motor. However, phase correction by shift of the tape always in a given direction (e.g., forwardly), is desirable, since thereby the circuitry leading to the motor 154 is simplified. Under such "one-way" phase correction, the extent of correction needed at any given time, will depend of the extent of lag of the synchronizing signal being sensed by the unit $66^b$, from the arrival of the burst signal denoting completion of a field of lateral scans of the kinescope beam. At most, the extent of correction will be small, since the distance between successive synchronizing signal records, 51, on the tape, is of the order of one-half inch, when the cross-scans are recorded at 2 mil intervals. It would seldom occur that phasing for an amount slightly less than such one-half inch, would be needed. Usually the phasing for a few deflection lines would be sufficient.

The energizing of the phasing motor 154 is produced when the signals denoting completion of fields of horizontal deflections of the beam scans, and the synchronizing signals denoting completion of the fields of recorded cross-scans carried by the tape, do not occur simultaneously. Accordingly, I have provided means to compare the arrivals of such two significant types of field translation signals, as to the instants of such arrivals to determine and produce signals denoting simultaneous or non-simultaneous arrivals thereof. Such means is as follows:

I have provided a relay unit 114 including two magnetizing solenoids 115 and 116 (see FIGURE 3). These solenoids are of equal magnetizing quality (ampere-turns), and they both act on the common armature 117. When either solenoid is energized it will actuate the armature to close the contacts 118 and 119. Such solenoids are however, differentially wound so that when they are both simultaneously energized their magnetizing effects cancel out, and the armature is not actuated and the contacts 118 and 119 remain in open circuit position, as shown in the figure. These contacts comprise a portion of the D.C. circuit which supplies the phasing motor. Accordingly, as long as the compared signals are produced simultaneously, such motor is not energized and no phasing function occurs. When, however, there is disparity between the arrival times of the two types of signals, the contacts 118 and 119 close, thus causing the motor to produce a phasing operation as long as such disparity continues.

It is now noted that such a phasing correction operation necessarily either increases or reduces the tape speed for a short interval. Such effect would affect the synchronizing operations produced or being produced by the synchronizing equipment already described. When the synchronizing operation has previously brought the two compared rates to equality, such a phasing operation would upset the completed synchronizing operation, causing the synchronizing equipment to resume its intended function. To avoid such interference between the two classes of corrections I have made the following provisions:

Referring to the detail showing of FIGURE 14, there is shown the relay having the solenoid 155 controlling the two sets of pairs of contacts 156 and 157 simultaneously. Each set includes three companion pairs of contacts for controlling a line of conductor. Normally the solenoid is unenergized and the contacts of each pair are bridged together to close the line which they control. Upon energizing the solenoid, all such pairs are brought to open circuit position, thus opening all six of the lines of the two sets. The pulse splitters 124 and 125 are shown in the fragmentary showing of FIGURE 14, with the suffixes "*a*," and the two motor elements 99 and 100 are also shown in this FIGURE 14, with suffixes "*a*." The lines between the pulse splitter 125 and the motor element 99 are carried through the relay contact set 156, and the lines between the pulse splitter 124 and the motor element 100 are carried through the relay contact set 157. Accordingly, whenever such relay is activated by energization of its solenoid, both sets of lines are broken, and the delivery of pulses to both motor elements is discontinued for the duration of such relay operation. Accordingly, no further synchronizing operation can be produced during such interval. The relay is connected to the line 112 which supplies current to the phasing motor during the intervals when phasing is being produced. Accordingly, whenever the phasing motor is energized, synchronizing operation is prevented, but such synchronizing operation may resume as soon as such phasing terminates. If it be assumed that the equipment has been synchronized, so that no back or forth movement of the disk 138 is occurring, synchronizing stability having been attained, then the opening of the circuits to the two motor elements will not change such stability, but the tape travel will remain at the exact speed attained for such synchronization, plus the slight speed produced by the phasing operation, until phasing has been completed. Thereupon delivery of current over the line 112 to the phasing motor, and to the solenoid 155 will be discontinued, phasing having been attained; and since the synchronizing equipment has not been disturbed during the phasing operation, the tape speed will immediately restore to the value which it had attained prior to such phasing operation.

It is undesirable that operation of the phasing motor shall occur when the tape drive motor is not operating. Otherwise operation of the phasing motor 154 will produce tape drive. Such an operation could occur only, but as long as, the relay 114 might stand in its contact closed position due to receipt of nonsynchronized signals from the synchronizing signal records on the tape, or from operation of the lateral deflection field termination signalling equipment. I have made provision for preventing supply of current to the phasing motor only when current is being also supplied to the tape drive motor. Such provision includes the relay 159 whose contacts are included in the line 112 which supplies current to the phasing motor. Such relay contacts are normally open, but closed in FIGURE 3. The solenoid 160 of such relay is connected to both of the lines supplying current to the tape drive motor, so that as long as the tape drive motor is being energized the line 112 for the phasing motor is closed, to enable such phasing motor to function whenever the contacts 118 and 119 of the relay 114 are closed.

The control of tape speed disclosed above is produced by use of a variable ratio drive element interposed between the "constant speed" drive motor and the sprocket shaft. In FIGURE 12 I have shown, schematically and in fragmentary form, a modified embodiment of control of the tape speed by use of a variable speed motor, variable through substantially continuous changes of speed between upper and lower limits, the disparity between the two compared rates producing speed control for variation of the motor speed in the proper direction of such variation until equality of the two rates is produced.

Thereupon the motor speed remains unchanged until a further correction is demanded to again attain synchronism between the two rates.

In FIGURE 12 the comparator shaft extension 107 and fine threaded end portion thereof, together with the block 128 threaded onto such extension, is shown. The tape drive motor armature 145 and the wound shunt field coils 146 and 147 are shown, such armature driving the shaft 82ª by direct drive (the motor unit including a suitable built-in gear speed reducer). The armature of such motor is connected across the lines 148 and 149. The two field coils 146 and 147 are connected in parallel with the armature; and a common line connects one side of such pair of coils to the movable contact 151 of a variable resistor element 150, so that the resistance included in the field coil circuit is variable through a range sufficient to produce a corresponding range of motor speeds. The block 128 with its extensions carries the contact 151 back and forth, an insulating block 152 carried by such extension element, carrying the contact 151. With this arrangement it is evident that the tape drive motor speed will be changed from time to time, with termination of the correction operation occurring when synchronization is attained. Further corrections will be produced as required to maintain synchronism.

I have also referred to production of synchronism between the compared rates, by correction of the rate of the horizontal deflections of the deflectable beam. In FIGURE 13 I have shown a fragmentary portion of the showing of FIGURE 3, wherein the comparator shaft extension 127 and its threaded block 128 serve to shift the deflection rate controlling element 113ᵇ of the saw-tooth generator or other deflection producing element, back and forth to effect needed adjustments of the rate of the deflectable beam (and the bursts which are used for signalling completion of successive fields of scans) are produced. It is not deemed necessary to further describe this modification since its synchronizing function will be understood from what has been disclosed hereinbefore.

Reference has been made to the splitting of the primary pulses, each into three sub-pulses for delivery to the stator coils of the two motor elements. These pulse splitters are shown at 124 and 125 in FIGURE 3. In FIGURE 8 I have shown a simple form of circuitry for producing such splitting of the primary pulse with delivery of three successive subpulses in rapid succession during the interval between the arrival of the primary pulse so split and the succeeding primary pulse. This arrangement of FIGURE 8 is as follows:

The three astable elements $A_1B_1$, $A_2B_2$ and $A_3B_3$ are connected in series. By astable circuit is meant a circuit that has a normal stable condition which can be triggered into another condition, remain in the second condition for a definite period of time, at the end of which it, by itself and without further external signal, goes through a transition back into the normal stable state, remaining in that normal stable state until another triggering signal is again received. Referring to FIGURE 8, in the normal state $A_1$, $A_2$ and $A_3$ are conducting, and $B_1$, $B_2$ and $B_3$ are cut off. Application of a signal to $A_1$ will then turn $A_1$ off, and $B_1$ on. This condition will hold for a definite period of time, normally determined by the discharge of a capacitor between two voltages, at the end of which a transition takes place to the original condition with $A_1$ on, and $B_1$ off. While $B_1$ is "On" the motor coil A (FIGURE 4) is energized.

The change in voltage at $B_1$ when $B_1$ goes off is used to cut off $A_2$ and turn $B_2$ on. Again, at the end of the period $A_2$ comes on, $B_2$ goes off, and the resulting signal cuts on $A_3$. At the end of a third period $A_3B_3$ goes back to its normal condition. As a result, a single pulse supplied at $A_1$ has caused coils A, B and C to be energized for definite periods of time.

In order to produce slight delays in the successive functioning of the elements and to ensure that the pulses delivered to the three coils of a motor do not occur almost simultaneously, I have shown the delay elements 108 and 109 between the elements $B_1$ and $A_2$, and between the elements $B_2$ and $A_3$. In this connection it is noted that when the arriving pulses arrive at the rate of 60 c.p.s., the successive divided pulses are separated by time intervals of slightly less than $\frac{1}{180}$ sec.

It is also noted that when such rate of the coil energizing pulses is used ($\frac{1}{180}$/sec.), the rotations of the rotor are substantially continuous, but under pulse activities. Therefore the shaft 102 and the rotor elements of both motor sections, will rotate substantially continuously, at the rate of 2 r.p.s., assuming that the primary signals are received at the rate of 60/c.p.s., produced by a tape speed of substantially 15¾ i.p.s. The rotational speed of the stator of the motor element 100 will almost always be slow, since that speed is determined by the difference between the two pulse rates; and such difference would, in all probability be very small, but enough to produce serious interference with the perfecting of translation of the picture.

In the showing of FIGURE 3 the phasing operation is performed by advancing (or retarding) the tape with respect to the synchronized drive from the motor (through the variable speed ratio unit 138–133), and the control of such phasing operation is effected by the differential solenoid unit 114. Instead of producing such phasing operation through an element of the tape drive it may be produced by changing the rate of the deflection and synchronizing signal producing unit for a short interval, leaving the rate of tape drive unchanged at the synchronized speed operations already disclosed. Such temporary change of the rate of the deflections (and the corresponding synchronizing signal) may be produced by the modified structure shown schematically in FIGURE 15. This unit comprises a direct control of the rate of deflection and synchronizing signals put out by the unit 113 under operation of the control element 113ª, by provision of a direct connection from the differential solenoid unit 114 to such deflection rate control element 113ª. In such modified arrangement of FIGURE 15 the unit 114 is numbered 114ᵇ, its coils are numbered 115ᵇ and 116ᵇ, and its armature is numbered 117ᵇ, such armature being directly connected to the signal rate controlling element 113ᵇ. The two solenoids have their terminals numbered 120ᵇ (corresponding to the lines 120 of FIGURE 3) and 121ᵇ (corresponding to the lines 121 of FIGURE 3). Thus, when the two sets of synchronizing signals are not in phase the synchronizing signals of one set at a time will produce functioning of the armature. On the other hand, when the two sets of synchronizing signals are in phase, they will neutralize each other, leaving the armature nonfunctioned, and producing no change in the frequency of the output signals, of the sawtooth generator or other deflection signal producing unit.

When using the above embodiment, with phasing control effected by temporary modification of the rate of the deflection signal producing operation, the differential unit including the gears 89 and 90, the pinions 92 and 93, and the motor 154, may be eliminated, the shaft 131 then being connected directly to the tape drive shaft 82. It is also evident that such modified means to produce phasing by temporary change of the rate of the deflection producing signals (and the corresponding synchronizing signal), may be used with any suitable control of the rate of tape speed for production of the synchronizing operation, including the tape rate control elements shown in FIGURE 3, and those shown in FIGURE 12.

I claim:

1. Means to sense and deliver intelligence signals corresponding to cross-scan recordings on a wide-band tape having a signal recording surface, said cross-scan recordings comprising successive fields of equal numbers of cross-scan recordings in all of the fields; including means to sense and deliver second defined synchronizing signals corresponding to synchronizing records on the tape defining the completion of successive fields of cross-scan recordings; means to sense the successive cross-scan recording and deliver intelligence signals corresponding to such sensing; said cross-scan sensing and intelligence signalling means including a laterally deflectable beam unit disposed in sensing position with respect to the tape record carrying surface, and being constituted to produce cross-scan sensing of the cross-scan recordings on such surface; means to advance the tape including a tape engaging element, a power-drive unit in driving connection with the tape engaging element; means to deliver lateral beam deflection producing signals to the deflectable beam unit for production of the sensing operations by said beam; means to produce and deliver a first defined synchronizing signal at completion of each group of lateral beam deflection producing signals corresponding to a field of such deflections; a synchronizing signal comparing unit; connections to deliver each second defined synchronizing signal to such comparing unit; and connections to deliver each first defined synchronizing signal to such comparing unit.

2. A tape sensing structure as defined in claim 1; wherein the deflectable beam unit comprises an electron beam unit, including a lateral beam deflection producing element comprising a deflection producing yoke; and wherein the means to produce the lateral beam producing signals comprises a saw-tooth generator; together with connections from such saw-tooth generator to the lateral beam deflecting yoke.

3. A structure as defined in claim 1; wherein the synchronizing signal sensing means includes synchronizing signal record sensing means; and means operative during playback to sense the arrival of the synchronizing signal records at the location of said synchronizing signal records sensing means, with production of a second defined synchronizing signal corresponding to the sensing of each such synchronizing signal record; said comparing unit comprising means operative during play-back to compare the rate of arrival of the second defined produced synchronizing signals, with the rate of production of the first defined produced synchronizing signals, including means to determine the algebraic difference between said rates; and movable means in operative connection with said algebraic difference determining means, constituted to deliver an indication of said algebraic difference.

4. A structure as defined in claim 3; wherein the rate comparing means comprises two stepping motors each including a stator and a rotor constituted to produce a predetermined angular displacement with respect to each other corresponding to each of successive pulses delivered to one of said elements, and the angular displacements of the stepping motors being equal to each other for pulses delivered to such motors; connections constituted to deliver the first defined synchronizing signals to one of the motors, and connections constituted to deliver the second defined synchronizing signals to the other motor; together with connections between the movable elements of the two motors constituted to deliver an indication corresponding to the difference between the rates of the angular displacements produced by such motors corresponding to the first and the second synchronizing signals delivered to such two motors.

5. A structure as defined in claim 4; wherein the two stepping motors each include a stator and a rotor, and wherein such stators and rotors are provided with companion sets of teeth with the teeth of the stator and the rotor of each motor companion to each other, and wherein the numbers of teeth of the rotor and the stator of each stepping motor are equal to each other, and wherein the numbers of teeth of such elements of both stepping motors are equal to each other; whereby each synchronizing signal delivered to either of such stepping motors produces angular advance of the rotary field force produced by such signal, equal to the angular advance of a synchronizing signal delivered to the other stepping motor.

6. A structure as defined in claim 5; wherein the rotors of both stepping motors are mounted in axial alignment with each other and are both connected together for rotation as a unit.

7. A structure as defined in claim 5; wherein the stator of one of the stepping motors is retained against rotary movement, and wherein the stator of the other stepping motor is journalled for rotation; and wherein the movable means which is constituted to deliver an indication of the algebraic difference between the two rates, comprises the stator which is journalled for rotation.

8. A structure as defined in claim 3; wherein the driving connection between the tape power-driving unit and the tape engaging element, includes means to change the ratio between the rate of such power-driving unit and the rate of the tape engaging element, constituted to change the rate of tape drive compared to rate of such power-driving unit; wherein said ratio changing means is constituted for variation of said ratio under control; together with operative connections between the movable means which is in operative connection with the algebraic difference determining means, and the ratio changing means, constituted to change the rate of tape drive compared to rate of such power-driving unit; said operative connections including means constituted to change said ratio in direction of change to reduce the algebraic difference between the rates of the first defined and the second defined synchronizing signals.

9. A structure as defined in claim 8; wherein said operative connections which include means constituted to change said ratio in direction of change to reduce said algebraic difference between the rates of the first defined and the second defined synchronizing signals, are constituted to cease such ratio changing operation when the difference between such rates is zero.

10. A structure as defined in claim 3; wherein the means which delivers lateral beam deflection producing signals and a first defined synchronizing signal corresponding to conclusion of each group of a predetermined number of consecutive cross-scan producing signals, includes means to vary the rate of delivery of the cross-scan signals and the first defined synchronizing signals; together with operative connections between the movable means which is in operative connection with the algebraic difference determining means, and such means which varies the rate of delivery of the cross-scan signals and the first defined synchronizing signals, constituted to change said rate of delivery of such synchronizing signals in direction to reduce the algebraic difference between the rates of the first defined and the second defined synchronizing signals.

11. A structure as defined in claim 10, wherein said operative connections which include means constituted to change said rate of delivery of the cross-scan signals and the first defined synchronizing signals in direction of change to reduce said algebraic difference between the rates of the first defined and the second defined synchronizing signals are constituted to cease such change of the rate of delivery of such signals when the difference between the rate of the first defined synchronizing signals and the rate of the second defined synchronizing signals is zero.

12. A structure as defined in claim 3; wherein the power-drive unit comprises a variable speed motor, means constituted to vary the speed of said motor, and means constituted to actuate said motor speed varying means; together with operative connections between the movable means which is in operative connection with the algebraic difference determining means, and such means which is constituted to actuate the motor speed varying means, constituted to cause the motor speed varying means to vary said means in direction of variation constituted to reduce the algebraic difference between the rates of the first defined synchronizing signals and the second defined synchronizing signals.

13. A structure as defined in claim 12; wherein said operative connections between the movable means which is in operative connection with the algebraic difference determining means, and the means which is constituted to cause the motor speed varying means, to vary said means in direction of variation constituted to reduce the algebraic difference between the rate of the first defined synchronizing signals and the rate of the second defined synchronizing signals, to cease when such algebraic difference is zero.

14. A structure as defined in claim 1; wherein the comparing unit is constituted to compare the rate of the first defined synchronizing signals, with the rate of the second defined synchronizing signals.

15. A structure as defined in claim 1; wherein the comparing unit is constituted to compare the instants of delivery of the first defined synchronizing signals, with the instants of delivery of the second defined synchronizing signals.

16. A structure as defined in claim 15; together with means to vary the rate of a selected one of the synchronizing signal producing means, in manner to cause the delivery of the first defined synchronizing signals and the delivery of the second defined synchronizing signals, to the comparing unit, to occur simultaneously; and means in connection with the comparing unit and the means which varies the rate of said selected synchronizing signal, to cause said variation of the rate of said selected signals, to cease when both sets of synchronizing signals are delivered to the comparing unit simultaneously.

17. A structure as defined in claim 16; wherein the selected one of the synchronizing signal producing means which is varied with cessation of said variation when both sets of synchronizing signals are delivered to the comparing unit simultaneously, is rate of tape travel synchronizing signal producing means.

18. A structure as defined in claim 16; wherein the selected one of the synchronizing signal producing means which is varied with cessation of said variation when both sets of synchronizing signals are delivered to the comparing unit simultaneously, is the horizontal deflection and synchronizing signal producing means.

19. A structure as defined in claim 1; wherein the comparing unit is constituted to compare the rates of delivery of the first defined synchronizing signals, with the rates of delivery of the second defined synchronizing signals.

20. A structure as defined in claim 19; together with means to vary the rate of tape travel with corresponding variation of the rate of delivery of the second defined synchronizing signals; and connections between the comparing unit and said rate of tape travel varying means constituted to cause the rate varying means to vary the rate of tape travel in manner to reduce the difference between the rates of both sets of synchronizing signals, and to cause said rate varying means to cease variation of the rate of tape travel when the rates of both sets of the synchronizing signals are equal to each other.

21. A structure as defined in claim 19; together with means to vary the rate of delivery of the lateral beam deflection signals and the rate of delivery of the first defined synchronizing signals; and connections between the comparing unit, and said lateral deflection and first defined synchronizing signals rate of production means, constituted to cause the rate varying means to vary the rate of production of the lateral deflection signals and the first defined synchronizing signals, in manner to reduce the difference between the rates of both sets of synchronizing signals, and to cause said rate varying means to cease variation of the rate of delivery of the lateral deflection signals and the rate of delivery of the first defined synchronizing signals, when the rates of both sets of the synchronizing signals are equal to each other.

22. A structure as defined in claim 1; wherein there are provided a first defined rate comparing unit and a second defined phase comparing unit, said rate comparing unit being constituted to compare the rates of the first defined synchronizing signals and the second defined synchronizing signals, and said phase comparing unit being constituted to compare the instants of production of the first defined synchronizing signals and the instants of production of the second defined synchronizing signals; first defined means to vary the rate of tape travel; connections between the first defined rate comparing unit and the first defined means to vary the rate of tape travel, constituted to vary the rate of tape travel in manner to reduce the difference between the two synchronizing rates, including means to cease such variation of the rate of tape travel when the rates of both sets of synchronizing signals are equal to each other; second defined means to vary the rate of tape travel; and connections between the second defined comparing unit and the second defined means to vary the rate of tape travel, constituted to reduce the difference between the instants of production of the synchronizing signals of the two sets, including means to cease such variation of the rate of tape travel when the synchronizing signals of the two sets are produced at the same instants.

23. A structure as defined in claim 22; together with means constituted to make ineffective the first defined means which is constituted to vary the rate of tape travel, when the synchronizing signals of the two sets are not produced simultaneously, and to make effective said first defined means which is constituted to vary the rate of tape travel when the synchronizing signals of the two sets are produced simultaneously.

No references cited.

RICHARD MURRAY, Primary Examiner

HOWARD W. BRITTON, Assistant Examiner

U.S. Cl. X.R.

179—100.2